(12) United States Patent
Kusase

(10) Patent No.: US 10,038,353 B2
(45) Date of Patent: Jul. 31, 2018

(54) DUAL-ROTOR ELECTRIC ROTATING MACHINE

(71) Applicant: DENSO CORPORATION, Kariya, Aichi-pref. (JP)

(72) Inventor: Shin Kusase, Obu (JP)

(73) Assignee: DENSO CORPORATION, Kariya (JP)

( * ) Notice: Subject to any disclaimer, the term of this patent is extended or adjusted under 35 U.S.C. 154(b) by 182 days.

(21) Appl. No.: 14/661,166

(22) Filed: Mar. 18, 2015

(65) Prior Publication Data
US 2015/0270754 A1 Sep. 24, 2015

(30) Foreign Application Priority Data
Mar. 18, 2014 (JP) .................. 2014-055111

(51) Int. Cl.
| | | |
|---|---|---|
| H02K 9/19 | (2006.01) | |
| H02K 3/12 | (2006.01) | |
| H02K 21/12 | (2006.01) | |
| H02K 9/10 | (2006.01) | |
| H02K 15/12 | (2006.01) | |
| H02K 16/02 | (2006.01) | |

(Continued)

(52) U.S. Cl.
CPC ............... *H02K 9/19* (2013.01); *H02K 3/12* (2013.01); *H02K 9/10* (2013.01); *H02K 15/125* (2013.01); *H02K 16/02* (2013.01); *H02K 21/12* (2013.01); *H02K 1/20* (2013.01); *H02K 3/24* (2013.01)

(58) Field of Classification Search
CPC .. H02K 1/06; H02K 1/12; H02K 1/14; H02K 1/146; H02K 1/18; H02K 1/24; H02K 1/27; H02K 1/278; H02K 1/2786; H02K 1/30; H02K 3/12; H02K 3/18; H02K 3/28; H02K 3/32; H02K 3/44; H02K 3/52; H02K 3/04; H02K 3/24; H02K 3/48; H02K 3/50

USPC .... 310/52, 54, 58–59, 60 R, 60 A, 201, 112, 310/114, 265–266

See application file for complete search history.

(56) References Cited

U.S. PATENT DOCUMENTS

| | | | | |
|---|---|---|---|---|
| 4,322,646 A | * | 3/1982 | Persson | .................... H02K 1/17 165/104.26 |
| 4,713,877 A | * | 12/1987 | Abbott | ................ C04B 35/2683 252/62.63 |

(Continued)

FOREIGN PATENT DOCUMENTS

| | | |
|---|---|---|
| JP | 2002-359953 | 12/2002 |
| JP | 2003-230262 | 8/2003 |
| JP | 2014-036562 | 2/2014 |

*Primary Examiner* — Tran Nguyen
(74) *Attorney, Agent, or Firm* — Nixon & Vanderhye P.C.

(57) ABSTRACT

A dual-rotor electric rotating machine includes a stator and first and second rotors that are arranged with the stator interposed therebetween. The stator includes a stator core, at least one stator winding and a stator core support. The at least one stator winding is formed of a plurality of electric conductor segments each of which is substantially U-shaped to have a base and a pair of end portions. The electric conductor segments are received in slots of the stator core so that the end portions of the electric conductor segments are located on the same side of the stator core as the stator core support and the bases of the electric conductor segments are located on the opposite side of the stator core to the stator core support. Each corresponding pair of the end portions of the electric conductor segments are electrically connected with each other.

9 Claims, 8 Drawing Sheets

(51) Int. Cl.
*H02K 1/20* (2006.01)
*H02K 3/24* (2006.01)

(56) References Cited

U.S. PATENT DOCUMENTS

| | | | | |
|---|---|---|---|---|
| 5,448,119 | A * | 9/1995 | Kono | G11B 19/2009 310/216.048 |
| 6,011,332 | A * | 1/2000 | Umeda | H02K 3/24 310/201 |
| 6,590,312 | B1 * | 7/2003 | Seguchi | B60K 6/26 310/114 |
| 7,193,348 | B2 * | 3/2007 | Wada | H02K 3/12 310/180 |
| 2003/0102764 | A1 | 6/2003 | Kusase | |
| 2003/0151315 | A1 * | 8/2003 | Choi | H02K 1/165 310/58 |
| 2004/0213269 | A1 * | 10/2004 | Furuse | H02K 16/00 370/398 |
| 2006/0033392 | A1 * | 2/2006 | Ritchey | H02K 7/108 310/112 |
| 2006/0138879 | A1 * | 6/2006 | Kusase | B60K 7/0007 310/67 R |
| 2007/0029888 | A1 * | 2/2007 | Schuler | B60N 2/0232 310/112 |
| 2007/0108865 | A1 * | 5/2007 | Jansen | H02K 1/146 310/266 |
| 2009/0309442 | A1 * | 12/2009 | Qu | H02K 16/02 310/114 |
| 2013/0181562 | A1 * | 7/2013 | Gieras | H02K 16/02 310/114 |
| 2013/0313938 | A1 | 11/2013 | Yamada et al. | |

* cited by examiner

DUAL-ROTOR ELECTRIC ROTATING MACHINE

CROSS-REFERENCE TO RELATED APPLICATION

This application is based on and claims priority from Japanese Patent Application No. 2014-55111, filed on Mar. 18, 2014, the content of which is hereby incorporated by reference in its entirety into this application.

BACKGROUND

1. Technical Field

The present invention relates to a dual-rotor electric rotating machine which includes a stator and two rotors that are arranged so as to have the stator interposed therebetween.

2. Description of Related Art

Japanese Patent Application. Publication No. JP2003230262A discloses an electric rotating machine. This machine includes a rotor core (or field core) that is substantially U-shaped in cross section so as to have a pair of surfaces separated from and facing each other. On each of the surfaces of the rotor core, magnet magnetic poles are circumferentially arranged at equal intervals alternately with non-magnet magnetic poles. Further, a field winding is arranged at a position corresponding to the bottom of the substantially U shape of the cross section of the rotor core. Moreover, between the surfaces of the rotor core, there is interposed an annular stator core (or armature core). That is, this machine is configured as a dual-rotor electric rotating machine which includes a stator and two rotors that are arranged so as to have the stator interposed therebetween.

With the above configuration, it is possible to increase the total volume of air gaps between the stator and the rotors, thereby securing high performance while minimizing the size of the machine.

On the other hand, with the above configuration, it may be difficult to wind a stator winding (or armature winding) around the stator core. Moreover, during the winding process, the stator winding may interfere with the stator core, thereby damaging an insulating coat of the stator winding. Further, for preventing the above damage from occurring, it may be needed to lower the space factors of the stator winding in slots of the stator core.

In addition, since the stator winding and the field winding are surrounded by the stator core and the rotors, it may be difficult to effectively dissipate heat generated in those windings during operation of the machine. Consequently, it may be difficult to secure continuous high-output operation of the machine.

SUMMARY

According to exemplary embodiments, there is provided a dual-rotor electric rotating machine which includes a stator and first and second rotors. The stator includes a stator core, at least one stator winding and a stator core support. The stator core has a plurality of slots formed therein. The at least one stator winding is mounted on the stator core so as to be received in the slots of the stator core. The stator core support is provided on one side of the stator core to support the stator core. The first and second rotors are rotatably arranged with the stator interposed therebetween. The at least one stator winding is formed of a plurality of electric conductor segments each of which is substantially U-shaped to have a base and a pair of end portions. The electric conductor segments are received in the slots of the stator core so that the end portions of the electric conductor segments are located on the same side of the stator core as the stator core support and the bases of the electric conductor segments are located on the opposite side of the stator core to the stator core support. Each corresponding pair of the end portions of the electric conductor segments are electrically connected with each other.

With the above configuration, it is possible to mount the at least one stator winding to the stator core only by inserting the substantially U-shaped electric conductor segments into the slots of the stator core. That is, it is unnecessary to wind the at least one stator winding around the stator core. Consequently, it is possible to prevent an insulating coat of the at least one stator winding from being damaged during the mounting of the at least one stator winding to the stator core without lowering the space factors of the at least one stator winding in the slots of the stator core. In other words, it is possible to secure high space factors of the at least one stator winding in the slots of the stator core. As a result, it is possible to secure high performance while minimizing the size of the dual-rotor electric rotating machine.

It is preferable that a plurality of fluid passages are formed in the stator core so as to allow fluid to flow through the fluid passages.

The fluid may be oil or air.

Preferably, the stator core has a back core portion that is configured to form a magnetic flux merging path in which magnetic fluxes from the first and second rotors merge with each other.

The dual-rotor electric rotating machine may further include a disc portion to which both the first and second rotors are fixed. In this case, it is preferable that the disc portion has a higher heat conductivity than the first and second rotors.

The first rotor may include a plurality of first magnets that are provided on a periphery of the first rotor facing the stator core. The second rotor may include a plurality of second magnets that are provided on a periphery of the second rotor facing the stator core. Each of the first magnets may be offset from a corresponding one of the second magnets in a circumferential direction of the stator core by a predetermined angle.

Alternatively, the first magnets may be arranged alternately with the second magnets in the circumferential direction of the stator core.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
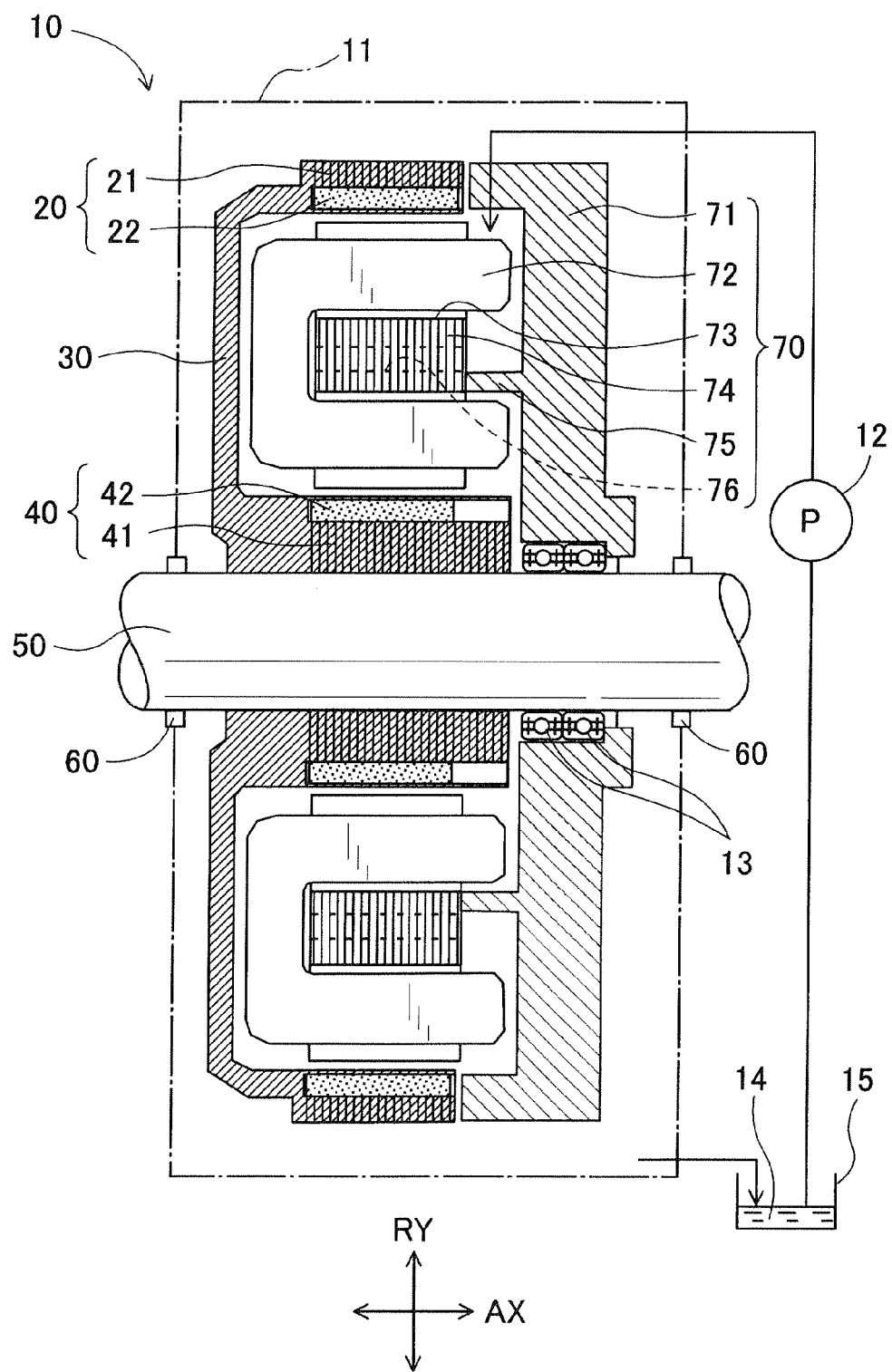
FIG. 1 is a schematic longitudinal cross-sectional view of a dual-rotor electric rotating machine according to a first embodiment.

Exemplary embodiments will be described hereinafter with reference to FIGS. 1-15. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

FIG. 1 shows the overall configuration of a dual-rotor electric rotating machine 10 according to a first embodiment.

In the present embodiment, the electric rotating machine 10 is configured as a motor-generator that selectively functions either as an electric motor or as an electric generator.

As shown in FIG. 1, the electric rotating machine 10 includes a housing 11, a pump 12, fluid 14, a reservoir 15, a first rotor 20, a second rotor 40, a disc portion 30, a rotating shaft 50 and a stator 70.

The housing 11, which is depicted with one-dot chain lines in FIG. 1, receives therein the first rotor 20, the second rotor 40, the disc portion 30, the rotating shaft 50 and the stator 70.

It should be appreciated that the housing 11 may be formed of any suitable material into any suitable shape provided that it can receive the aforementioned components therein.

Moreover, the fluid 14, which is drawn up by the pump 12 from the reservoir 15, flows inside the housing 11. Therefore, there are provided seal members 60 to seal between the housing 11 and the rotating shaft 50.

The fluid 14 is implemented by, for example, oil or air. The reservoir 15 is a part, member or container for storing the fluid 14. In addition, the reservoir 15 may be configured to be capable of cooling or heating the fluid 14 stored therein.

The first and second rotors 20 and 40 are arranged so as to have an annular stator core 74 of the stator 70 interposed therebetween in a predetermined direction, more particularly in a radial direction RY in the present embodiment. Moreover, both the first and second rotors 20 and 40 are fixed to the disc portion 30.

More specifically, in the present embodiment, the first rotor 20 is arranged radially outside the stator core 74, and the second rotor 40 is arranged radially inside the stator core 74.

The first rotor 20 has a plurality of magnets 22 arranged on a radially inner periphery thereof facing the stator core 74 and a back yoke portion 21 formed on the radially outside (i.e., the side away from the stator core 74) of the magnets 22. In operation, the back yoke portion 21 forms a path through which magnetic flux flows.

The second rotor 40 has a plurality of magnets 42 arranged on a radially outer periphery thereof facing the stator core 74 and a back yoke portion 41 formed on the radially inside (i.e., the side away from the stator core 74) of the magnets 42. In operation, the back yoke portion 41 forms a path through which magnetic flux flows.

The disc portion 30 is provided on the opposite side (i.e., the left side in FIG. 1) of the stator core 74 to a stator core support 71. The disc portion 30 is fixed by fixing means to the rotating shaft 50. The fixing means may be implemented by, for example, one of the following: fastening with fastening members such bolts or screws, joining such as arc welding and bonding with an adhesive. The disc portion 30 functions both as a fixing member for fixing the first and second rotors 20 and 40 and as a heat-dissipating member for dissipating heat generated in the first and second rotors 20 and 40 and stator windings 72 of the stator 70. The disc portion 30 may be formed of any suitable material into any suitable shape. Moreover, the disc portion 30 may have the same heat conductivity as the first and second rotors 20 and 40. However, in terms of improving the heat-dissipating capability, it is preferable for the disc portion 30 to have a higher heat conductivity than the first and second rotors 20 and 40. Further, though not shown in the figures, a fan may be provided to more effectively dissipate the heat generated in the first and second rotors 20 and 40 and the stator windings 72. In addition, the disc portion 30 may be integrally formed with the rotating shaft 50.

The rotating shaft 50 transmits torque generated by rotation of the first and second rotors 20 and 40 to an external device or machine or transmits torque from an external device or machine to the first and second rotors 20 and 40 to rotate them. The rotating shaft 50 may be formed of any suitable material into any suitable shape.

The stator 70 includes the stator core support 71, the stator windings 72 and the stator core 74.

The stator core support 71 is provided on one axial side (i.e., the right side in FIG. 1) of the stator core 74 to support the stator core 74. The stator core support 71 is fixed by fixing means to the housing 11. Moreover, the stator core support 71 rotatably supports the rotating shaft 50 via bearings 13 provided between the stator core support 71 and the rotating shaft 50.

Each of the stator windings 72 is formed of a plurality of substantially U-shaped electric conductor segments 80 into a single continuous electric wire. The electric conductor segments 80 may be formed of any suitable electrically-conductive material (e.g., copper, aluminum or iron) into any suitable cross-sectional shape. More particularly, in the present embodiment, each of the electric conductor segments 80 is formed to have a rectangular cross-sectional shape and covered with an insulating coat.

Moreover, for each phase of electric rotating machine 10, there is provided at least one corresponding stator winding 72. For example, in the case of the electric rotating machine 10 being a three-phase machine, there are provided at least one U-phase winding 72, at least one V-phase winding 72 and at least one W-phase winding 72.

The stator core 74 has formed therein a plurality of slots 73, a plurality of fluid passages 76, a plurality of stator teeth 79 and a back yoke portion 7A.

Figure 10:
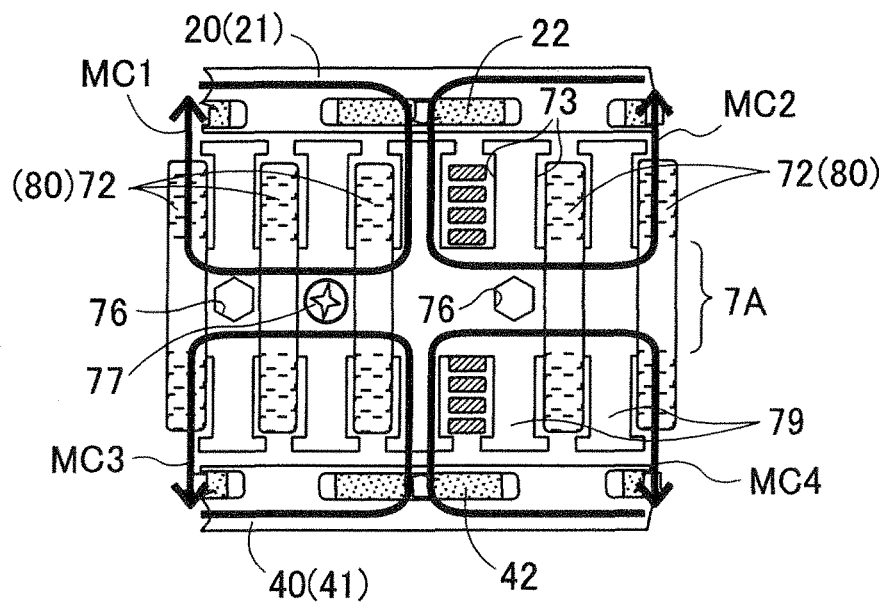
FIG. 10 is a cross-sectional view taken along the line X-X in FIG. 9.
Figure 11:
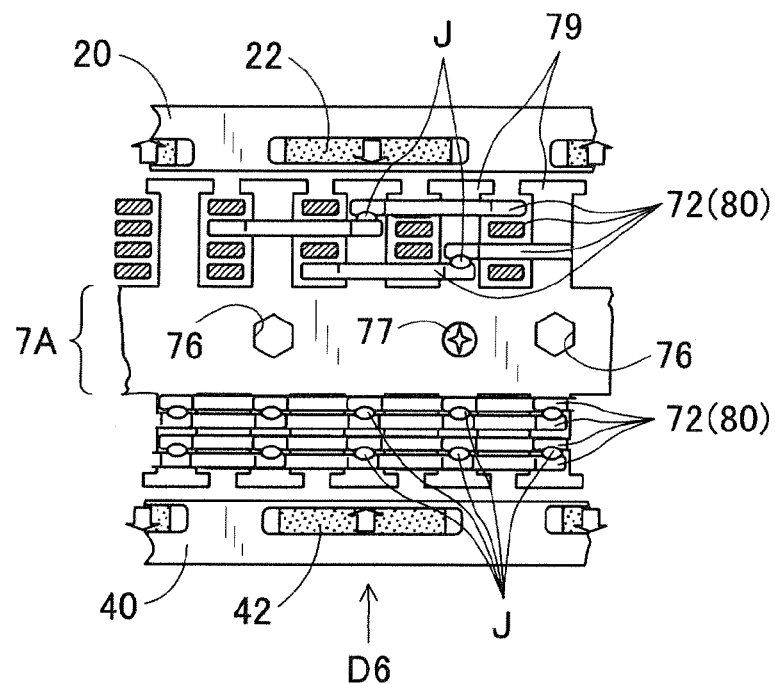
FIG. 11 is a cross-sectional view taken along the line XI-XI in FIG. 9.

Referring to FIGS. 10-11, each of the slots 73 is formed between one adjacent pair of the stator teeth 79. The stator windings 72 are mounted on the stator core 74 so as to be received in the slots 73 of the stator core 74. The number (Sc) of the stator teeth 79 may be set to be greater than or equal to the product of the number (Ph) of phases and the number (Po) of poles (i.e., Sc≥Ph×Po).

Each of the fluid passages 76, which are depicted with dashed lines in FIG. 1, is formed as a through-hole extending in the axial direction Ax of the stator core 74. In operation, the fluid 14 flows through the fluid passages 76, thereby cooling the stator core 74 and the stator windings 72 mounted on the stator core 74.

In addition, each of the fluid passages 76 may be formed along any other direction than the axial direction AX provided that it is possible to effectively cool the stator core 74 and the stator windings 72 with the fluid 14 flowing through the fluid passages 76. Moreover, the cross-sectional shape and the number of the fluid passages 76 may be suitably set so that it is possible to effectively cool the stator core 74 and the stator windings 72 with the fluid 14 flowing through the fluid passages 76.

Referring again to FIGS. 10-11, the back yoke portion 7A extends in the circumferential direction of the stator core 74 so as to connect all the stator teeth 79. As will be described in detail later, in the present embodiment, the number and angular positions of poles of the first rotor 20 are matched with those of the second rotor 40 so that the back yoke portion 7A forms a magnetic flux merging path in which magnetic fluxes from the first and second rotors 20 and 40 merge with each other.

Next, a method of manufacturing the stator 70 according to the present embodiment will be described hereinafter with reference to FIGS. 2-9.

Figure 2:
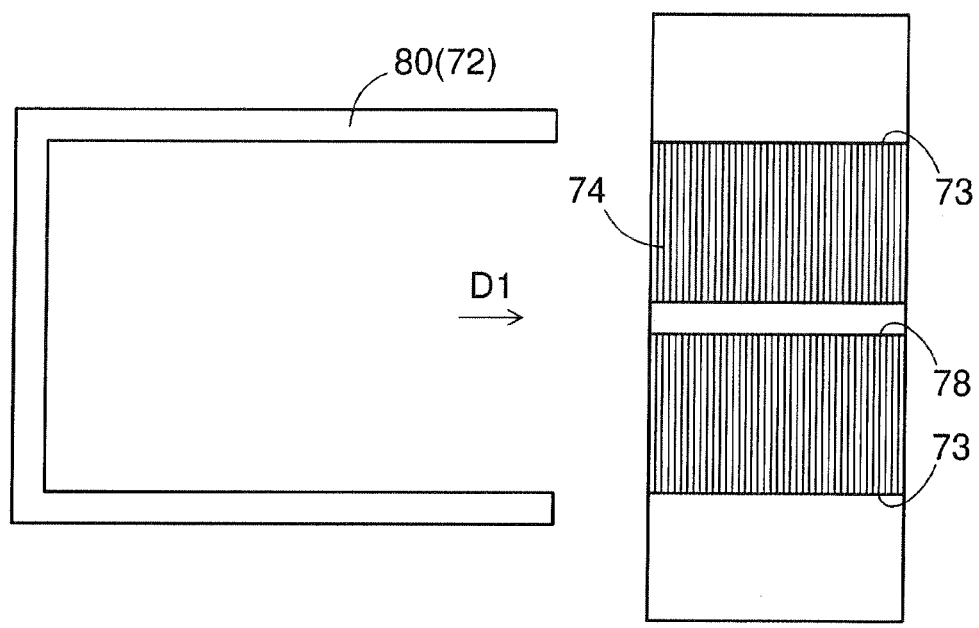
FIG. 2 is a schematic view illustrating one of a plurality of substantially U-shaped electric conductor segments before being inserted in a pair of slots of a stator core of the electric rotating machine, the plurality of U-shaped electric conductor segments together forming stator windings of the electric rotating machine.

As shown in FIG. 2, each of the substantially U-shaped electric conductor segments 80 forming the stator windings 72 is first placed with its opening facing the stator core 74. Then, the electric conductor segment 80 is moved in a direction D1 toward the stator core 74, thereby being inserted into a pair of slots 73 of the stator core 74.

Figure 3:
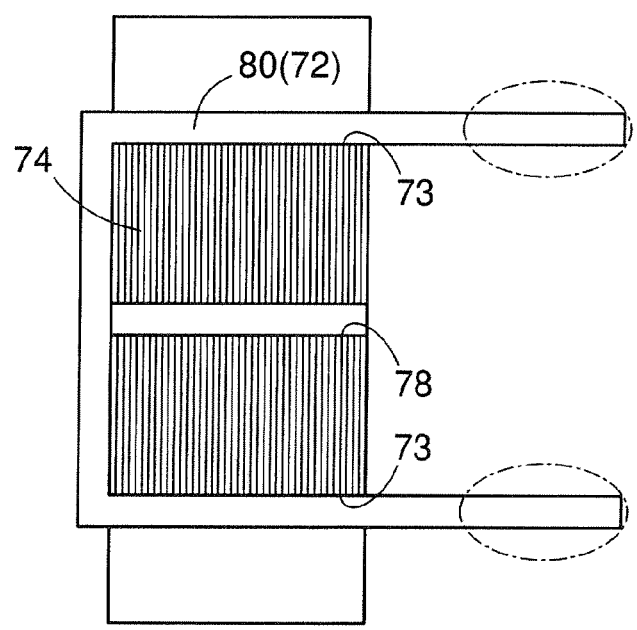
FIG. 3 is a schematic view illustrating the electric conductor segment after being inserted in the pair of slots of the stator core.

FIG. 3 shows the electric conductor segment 80 in the state of having been inserted in the pair of slots 73 of the stator core 74. From this state, a bending process is performed on end portions of the electric conductor segment 80 which are circled with one-dot chain lines in FIG. 3. In addition, the bending process may be performed either using a machine or manually.

Figure 4:
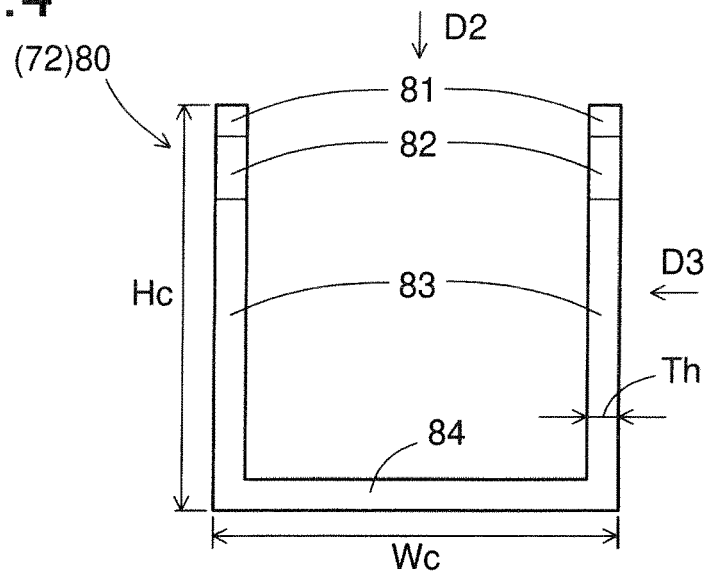
FIG. 4 is a plan view of the electric conductor segment after being bent to be connected to other U-shaped electric conductor segments mounted on the stator core.
Figure 5:
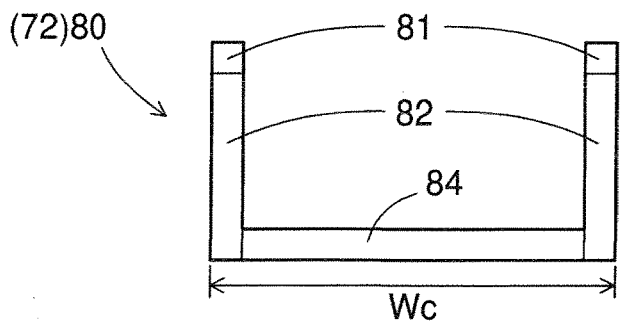
FIG. 5 is a side view of the electric conductor segment along the D2 direction in FIG. 4.
Figure 6:
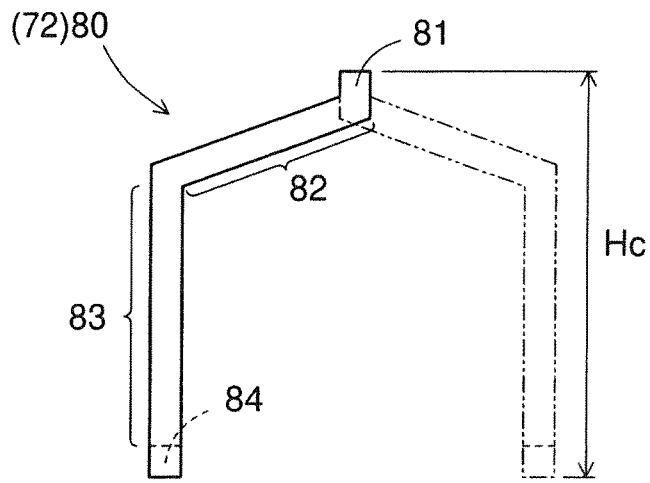
FIG. 6 is a side view of the electric conductor segment along the D3 direction in FIG. 4.

FIGS. 4-6 show the electric conductor segment 80 in the state of having been bent by the bending process.

As shown in FIGS. 4-6, in the present embodiment, each of the electric conductor segments 80 forming the stator windings 72 has a thickness Th, a height He and a width We. The height He and the width We may be set to any suitable values. In addition, the electric conductor segments 80 may be rounded or chamfered at their corner portions.

Each of the electric conductor segments 80 is substantially U-shaped to have a pair of end portions 81, a pair of intermediate portions 82, a pair of in-slot portions 83 and a base (or bottom portion) 84.

Each of the end portions 81 is to be connected to another U-shaped electric conductor segment 80. Each of the in-slot portions 83 is received in one of the slots 73 of the stator core 74. Each of the intermediate portions 82 extends between a corresponding pair of the end portions 81 and the in-slot portions 83. The length of the intermediate portions 82 and the angles between the intermediate portions 82 and the in-slot portions 83 may be set to any suitable values. The base 84 extends to connect the pair of in-slot portions 83. In addition, the end portions 81 and the intermediate portions 82 are located the same axial side (i.e., the right side in FIGS. 1 and 7-9) of the stator core 73 as the stator core support 71, and the base 84 is located on the opposite axial side (i.e., the left side in FIGS. 1 and 7-9) of the stator core 74 to the stator core support 71.

Moreover, it is possible to bend one of the two intermediate portions 82 as illustrated with the continuous lines in FIG. 6 while bending the other intermediate portion 82 as illustrated with the two-dot chain lines in FIG. 6. In other words, it is possible to bend the two intermediate portions 82 so as to be mirror images of each other.

In addition, for some of the electric conductor segments 80, the end portions 81 and the intermediate portions 82 may be kept straight without being bent by the bending process, so as to constitute terminals of the stator windings 72 to be electrically connected to an external device (e.g., an ECU).

Figure 7:
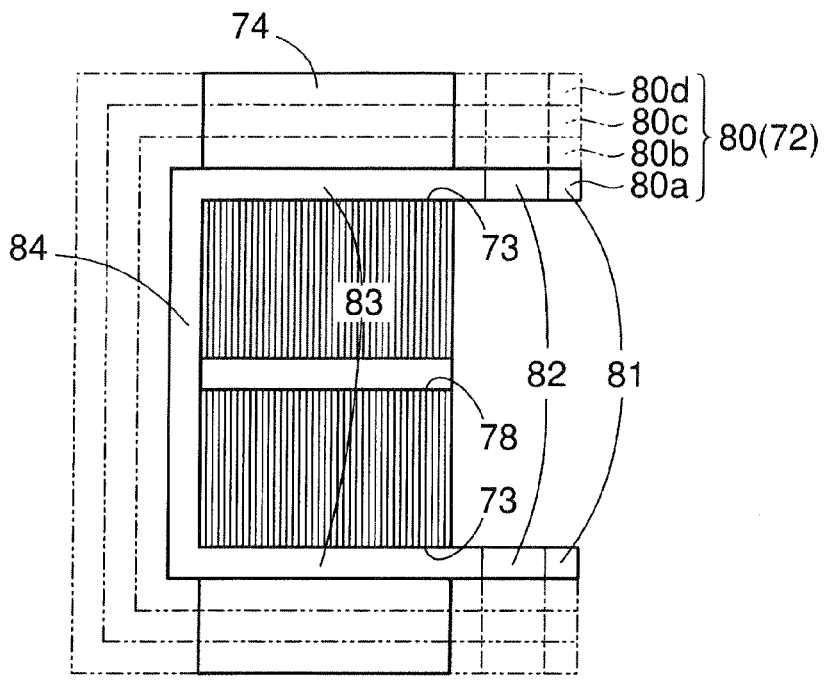
FIG. 7 is a schematic cross-sectional view illustrating four substantially U-shaped electric conductor segments stacked in the same slots of the stator core.
Figure 8:
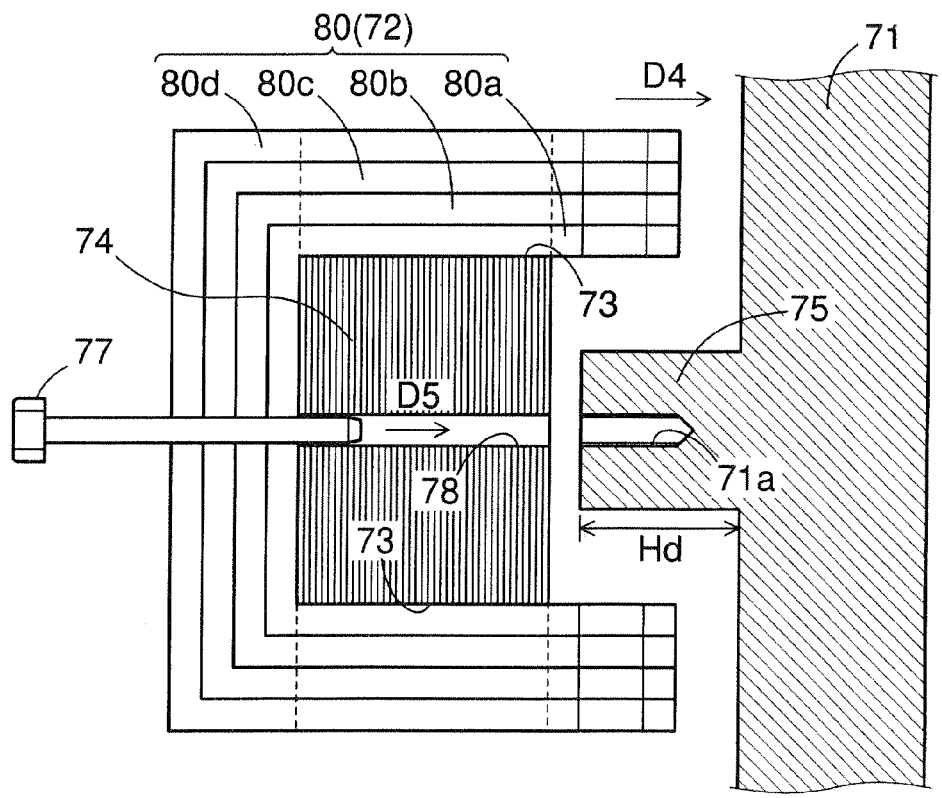
FIG. 8 is a schematic view illustrating an example of fixing the stator core, on which the electric conductor segments are mounted, to a stator core support.

Referring now to FIGS. 7-8, the electric conductor segments 80 forming the stator windings 72 include a plurality of types of U-shaped electric conductor segments having different sizes.

More particularly, in the present embodiment, the electric conductor segments 80 forming the stator windings 72 include four types of U-shaped electric conductor segments having different sizes, i.e., first electric conductor segments 80*a* having the smallest size, second electric conductor segments 80*b* having a larger size than the first electric conductor segments 80*a*, third electric conductor segments 80*c* having a larger size than the second electric conductor segments 80*b*, and fourth electric conductor segments 80*d* having the largest size.

The first to the fourth U-shaped electric conductor segments 80*a*-80*d* are stacked in four layers in the slots 73 of the stator core 74. Consequently, in each of the slots 73 of the stator core 74, there are received one of the first electric conductor segments 80*a* at the first layer (i.e., the innermost layer), one of the second electric conductor segments 80*b* in the second layer, one of the third electric conductor segments 80*c* in the third layer and one of the fourth electric conductor segments 80*d* in the fourth layer (i.e., the outermost layer).

Moreover, all the electric conductor segments 80 are bent by the bending process as described above. Then, corresponding pairs of the end portions 81 of the electric conductor segments 80 are joined, for example by welding (laser welding or arc welding), forming joints J between the end portions 81 (see FIG. 9). Consequently, the stator windings 72 are obtained each of which is in the form of a single continuous electric wire constituted of a predetermined number of the electric conductor segments 80.

In addition, the number of layers of the electric conductor segments 80 stacked in each slot 73 of the stator core 74, the number of the electric conductor segments 80 used for forming each stator winding 72, and the number of the stator windings 72 provided for each phase of the electric rotating machine 10 may be set to any suitable values.

After forming the stator windings 72 on the stator core 74, the stator core 74 is fixed by fixing means to the stator core support 71.

More particularly, in the present embodiment, as shown in FIG. 8, at least one through-hole 78 is formed in the stator core 74, and at least one threaded hole 71a is formed in a supporting portion 75 of the stator core support 71. A bolt (i.e., fixing member) 77 is placed through the through-hole 78 of the stator core 74 and fastened into the threaded hole 71a of the stator core support 71, thereby fixing the stator core 74 to the stator core support 71.

Moreover, referring to FIGS. 10-11, the at least one through-hole 78 is formed in the stator core 74 so as to be offset from the electric conductor segments 80 and the fluid passages 76 in the circumferential direction of the stator core 74 (i.e., the direction perpendicular to the paper surface of FIG. 8 and the left-right direction in FIGS. 10-11).

In addition, though not shown in the figures, it is also possible to weld contacting portions between the stator core 74 and the stator core support 71.

Figure 9:
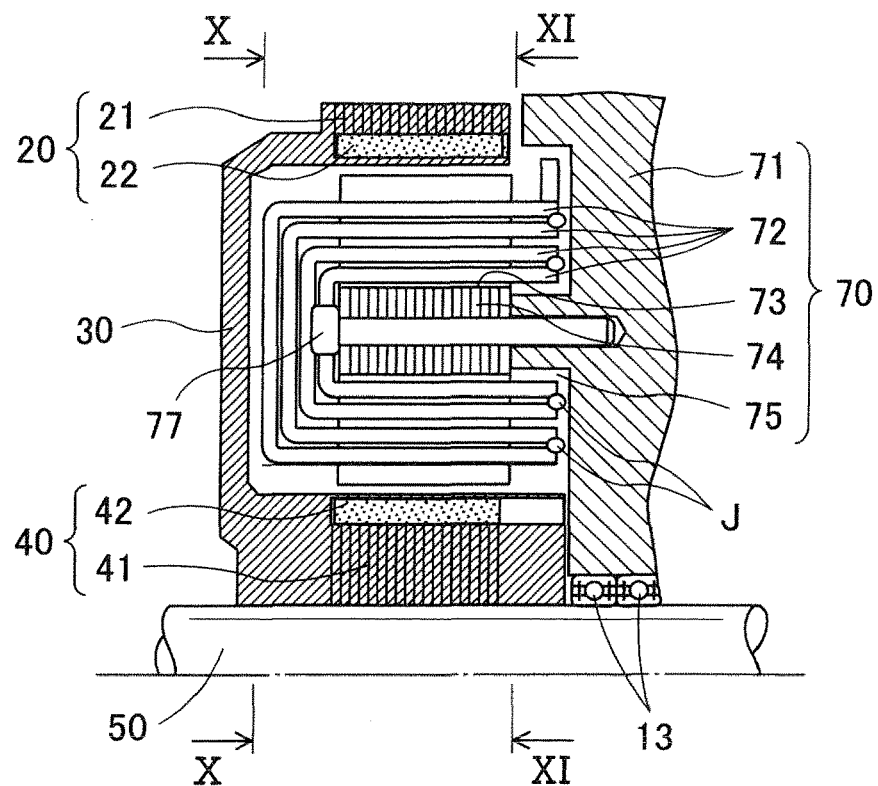
FIG. 9 is a schematic cross-sectional view illustrating the arrangement of a stator and two rotors in the electric rotating machine.

FIG. 9 shows an upper part of the electric rotating machine 10 within the housing 11.

As shown in the FIG. 9, in the finally-obtained electric rotating machine 10, the electric conductor segments 80 forming the stator windings 72 are received in the slots 73 of the stator core 74 such that: the end portions 81 of the electric conductor segments 80 are located on the same axial side (i.e., the right side in FIG. 9) of the stator core 74 as the stator core support 71 and the bases 84 of the electric conductor segments 80 are located on the opposite axial side (i.e., the left side in FIG. 9) of the stator core 74 to the stator core support 71.

Referring to FIG. 10, when electric current flows in the stator windings 72, magnetic circuits MC1-MC4 are formed between the stator 70 and the first and second rotors 20 and 40 that are rotatably arranged radially outside and inside the stator core 74, respectively. In addition, for the sake of ease of understanding, those of the electric conductor segments 80 forming the stator windings 72 which are located on the center-right area in FIG. 10 are shown in cross section.

More specifically, along the magnetic circuit MC1, magnetic flux flows (or circulates) to successively pass the following: the magnets 22 of the first rotor 20→the gap between the first rotor 20 and the stator core 74→the stator core 74→the back yoke portion 7A→the stator core 74→the gap between the first rotor 20 and the stator core 74→the magnets 22→the back yoke portion 21. Along the magnetic circuit MC2, magnetic flux flows (or circulates) so that the magnetic circuits MC1 and MC2 are mirror images of each other. Along the magnetic circuit MC3, magnetic flux flows (or circulates) to successively pass the following: the magnets 42 of the second rotor 40→the gap between the second rotor 40 and the stator core 74→the stator core 74→the back yoke portion 7A→the stator core 74→the gap between the second rotor 40 and the stator core 74→the magnets 42→the back yoke portion 41. Along the magnetic circuit MC4, magnetic flux flows (or circulates) so that the magnetic circuits MC3 and MC4 are mirror images of each other.

Moreover, in the back yoke portion 7A of the stator core 74, the magnetic flux flowing along the magnetic circuit M1 merges with the magnetic flux flowing along the magnetic circuit M3; the magnetic flux flowing along the magnetic circuit M2 merges with the magnetic flux flowing along the magnetic circuit M4. That is to say, the back yoke portion 7A forms the magnetic flux merging path.

With the magnetic fluxes flowing in the above-described manner, both the first and second rotors 20 and 40 are rotated in a predetermined direction. In addition, the directions of the magnetic fluxes flowing along the magnetic circuits MC1-MC4 and the direction of rotation of the first and second rotors 20 and 40 may be reversed depending on the direction of the electric current supplied to the stator windings 72.

Further, torque generated by the rotation of the first and second rotors 20 and 40 is transmitted via the rotating shaft 50 to an external device or machine.

In contrast, when torque is transmitted from an external device or machine to the rotating shaft 50, both the first and second rotors 20 and 40 are rotated by the torque, thereby inducing counter-electromotive force in the stator windings 72.

In addition, in FIG. 10, the fluid passages 76 are formed in the stator core 74 to have a hexagonal cross-sectional shape. However, the fluid passages 76 may also be formed to have any other suitable cross-sectional shape, such as a circular, elliptical or rectangular cross-sectional shape.

Referring to FIG. 11, in the present embodiment, for each joined-pair of the electric conductor segments 80 forming the stator windings 72, the two electric conductor segments 80 of the pair are located at different layers in the respective slots 73 of the stator core 74. In addition, for the sake of ease of understanding, in the upper part of FIG. 11, the electric conductor segments 80 are shown in cross-section and only some of the electric conductor segments 80 are depicted as being joined to other electric conductor segments 80.

Figure 12:
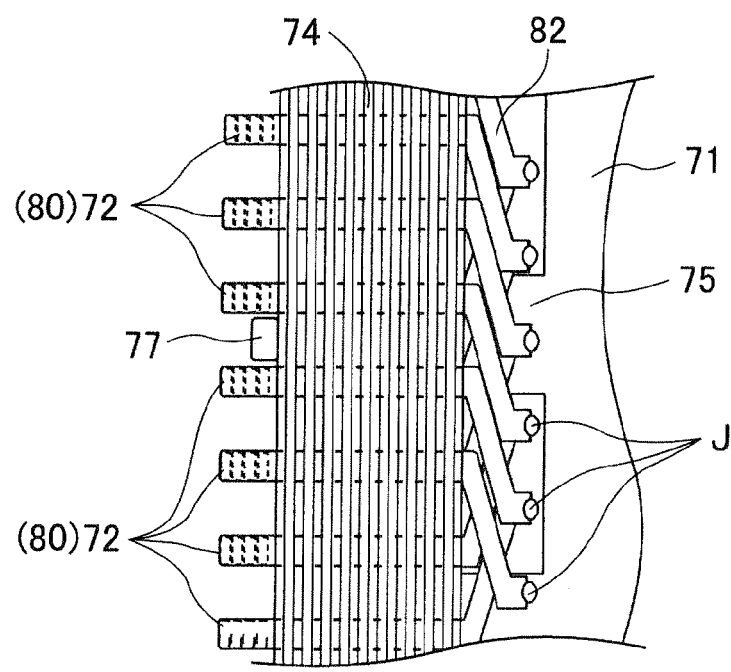
FIG. 12 is a side view along the direction D6 in FIG. 11.

Moreover, referring to FIG. 12, in the present embodiment, the electric conductor segments 80 forming the stator windings 72 are bent so that the intermediate portions 82 of the electric conductor segments 80 extend obliquely with respect to the circumferential direction of the stator core 74 (i.e., the vertical direction in FIG. 12). Consequently, the intermediate portions 82 of the electric conductor segments 80 are densely arranged such that the intermediate portions 82 protruding from the adjacent slots 73 of the stator core 74 extend parallel to each other.

Figure 13:
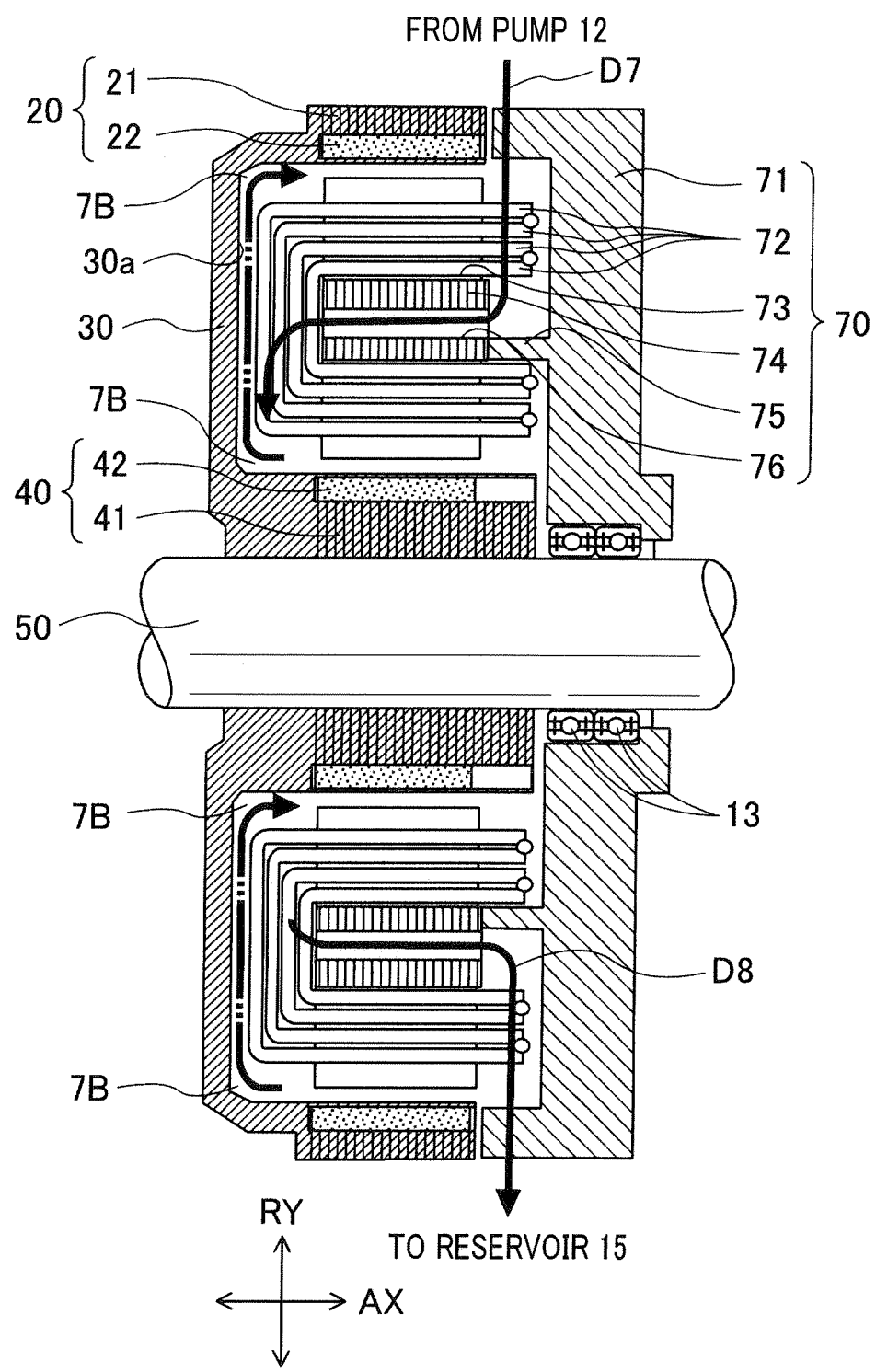
FIG. 13 is a schematic longitudinal cross-sectional view illustrating the flow path of fluid formed in the electric rotating machine.

Next, cooling of the dual-rotor electric rotating machine 10 according to the present embodiment will be described with reference to FIG. 13.

The fluid 14, which is drawn up by the pump 12 from the reservoir 15, is introduced between the stator core 74 and the stator core support 71. The introduced fluid 14 falls down to collide with upper parts of the stator windings 72, thereby cooling the upper parts of the stator windings 72. Then, as indicated with the arrow D7 in FIG. 13, the fluid 14 flows, via the supporting portion 75 of the stator core support 71, through the upper fluid passages 76, thereby cooling an upper part of the stator core 74. Thereafter, the fluid 14, which flows out from the left ends of the upper fluid passages 76, enters a space 7B surrounded by the stator core 74 and the disc portion 30.

In the space 7B, the fluid 14 first collides with the stator windings 72 and then falls down along an inner wall 30a of the disc portion 30. When the disc portion 30 rotates along with the rotating shaft 50, part of the fluid 14 moves upward due to the centrifugal force as indicated with the bold two-dot chain lines in FIG. 13. The remaining fluid 14 enters the lower fluid passages 76 from the space 7B. Then, as indicated with the arrow D8 in FIG. 13, the fluid 14 flows through the lower fluid passages 76, thereby cooling a lower part of the stator core 74. Further, the fluid 14, which flows out from the right ends of the lower fluid passages 76, falls down to collide with lower parts of the stator windings 72, thereby cooling the lower parts of the stator windings 72. Thereafter, the fluid 14 returns to the reservoir 15.

In addition, it should be noted that though only the cooling of the dual-rotor electric rotating machine 10 is described above, heating of the dual-rotor electric rotating machine 10 can also be made in a similar manner to the cooling.

The above-described dual-rotor electric rotating machine 10 according to the present embodiment has the following advantages.

In the present embodiment, the dual-rotor electric rotating machine 10 includes the stator 70 and the first and second rotors 20 and 40. The stator 70 includes the stator core 74, the stator windings 72, and the stator core support 71. The stator core 70 has the slots 73 formed therein. The stator windings 72 are mounted on the stator core 74 so as to be received in the slots 73 of the stator core 74. The stator core support 71 is provided on one axial side (i.e., the right side in FIGS. 1 and 9) of the stator core 74 to support the stator core 74. The first and second rotors 20 and 40 are rotatably arranged with the stator 70 radially interposed therebetween. Each of the stator windings 72 is formed of the predetermined number of the substantially U-shaped electric conductor segments 80. Each of the electric conductor segments 80 has the base 84 and the pair of end portions 81. The electric conductor segments 80 are received in the slots 73 of the stator core 74 so that the end portions 81 of the electric conductor segments 80 are located on the same axial side of the stator core 74 as the stator core support 71 and the bases 84 of the electric conductor segments 80 are located on the opposite side of the stator core 74 to the stator core support 71. Each corresponding pair of the end portions 81 of the electric conductor segments 80 are electrically connected with each other.

With the above configuration, it is possible to mount the stator windings 72 to the stator core 74 only by axially inserting the substantially U-shaped electric conductor segments 80 into the slots 73 of the stator core 74. That is, it is unnecessary to wind the stator windings 72 around the stator core 74. Consequently, it is possible to prevent the insulating coats of the stator windings 72 from being damaged during the mounting of the stator windings 72 to the stator core 74 without lowering the space factors of the stator windings 72 in the slots 73 of the stator core 74. In other words, it is possible to secure high space factors of the stator windings 72 in the slots 73 of the stator core 74. As a result, it is possible to secure high performance while minimizing the size of the dual-rotor electric rotating machine 10.

Moreover, in the present embodiment, the stator core 74 has the fluid passages 76 formed therein.

Consequently, it is possible to cool the stator core 74 and the spaces surrounded by the stator core 74 and the first and second rotors 20 and 40 by making the fluid 14 of low temperature flow through the fluid passages 76. As a result, it is possible to effectively dissipate the heat generated in the first and second rotors 20 and 40 and the stator 70, thereby securing continuous high-output operation of the dual-rotor electric rotating machine 10. On the other hand, in a cold region or during a cold period, it is possible to easily activate the dual-rotor electric rotating machine 10 by making the fluid 14 of high temperature flow through the fluid passages 76.

In the present embodiment, the fluid 14 is implemented by oil or air.

Consequently, it is possible to achieve the effective of cooling the dual-rotor electric rotating machine 10 at low cost.

In the present embodiment, the stator core 74 has the back core portion 7A that is configured to form the magnetic flux merging path in which the magnetic fluxes MC1 and MC2 from the first rotor 20 respectively merge with the magnetic fluxes MC3 and MC4 from the second rotor 40.

Consequently, with the back core portion 7A, it is possible to further improve the performance (e.g., output torque) of the dual-rotor electric rotating machine 10.

In the present embodiment, the dual-rotor electric rotating machine 10 includes the disc portion 30 to which both the first and second rotors 20 and 40 are fixed. The disc portion 30 has a higher heat conductivity than the first and second rotors 20 and 40.

With the above configuration, it is possible to more effectively dissipate the heat generated in the first and second rotors 20 and 40 and the stator 70.

Second Embodiment

In the previous embodiment, the number of the magnets 22 arranged on the radially inner periphery of the first rotor 20 is equal to the number of the magnets 42 arranged on the radially outer periphery of the second rotor 40. Moreover, each of the magnets 22 of the first rotor 20 is radially aligned with a corresponding one of the magnets 42 of the second rotor 40. In other words, each of the magnets 42 of the first rotor 20 is not offset from the corresponding magnet 42 of the second rotor 40 in the circumferential direction of the stator core 74 (i.e., the left-right direction in FIG. 10).

Figure 14:
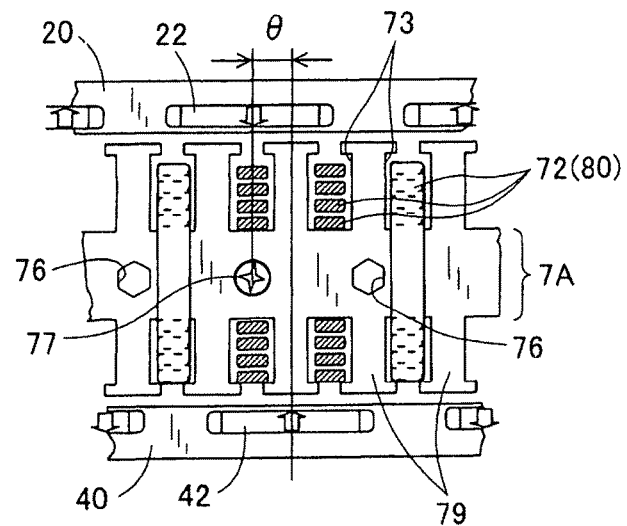
FIG. 14 is a schematic view illustrating the configuration of rotors according to a second embodiment.

In comparison, in the present embodiment, as shown in FIG. 14, each of the magnets 22 of the first rotor 20 is offset from a corresponding one of the magnets 42 of the second rotor 40 in the circumferential direction of the stator core 74 by a predetermined angle θ. In addition, the predetermined angle θ may be greater than or equal to 25° and less than or equal to 35°.

With the above configuration, there will be a phase difference between magnetic flux from the first rotor 20 and magnetic flux from the second rotor 40, thereby reducing torque ripple in the dual-rotor electric rotating machine 10.

Third Embodiment

In the previous embodiments, each of the magnets 22 of the first rotor 20 overlaps a corresponding one of the magnets 42 of the second rotor 40 in a radial direction of the stator core 74 (see FIGS. 10 and 14).

Figure 15:
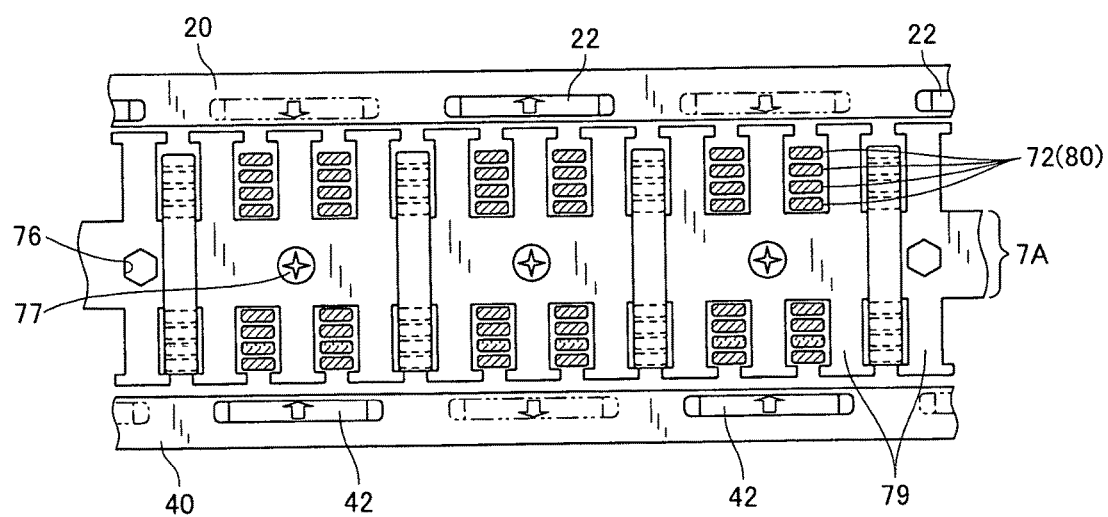
FIG. 15 is a schematic view illustrating the configuration of rotors according to a third embodiment.

In comparison, in the present embodiment, some of the magnets 22 are omitted from the first rotor 20 as indicated with two-dot chain lines in FIG. 15; though not shown in the figure, some of the magnets 42 are omitted from the second rotor 40. Consequently, none of the magnets 22 of the first rotor 20 overlap any of the magnets 42 of the second rotor 40 in a radial direction of the stator core 74. That is, in the present embodiment, the magnets 22 of the first rotor 20 are arranged alternately with the magnets 42 of the second rotor 40 in the circumferential direction of the stator core 74 (i.e., the left-right direction in FIG. 15).

As a result, in the present embodiment, each of the magnets 22 of the first rotor 20 is radially aligned with a consequent magnetic pole of the stator core 74 which is constituted of a part of the second rotor 40. Each of the magnets 42 of the second rotor 40 is radially aligned with a consequent magnetic pole of the stator core 74 which is constituted of a part of the first rotor 20. With this configuration, magnetic fluxes will flow in the same manner as described in the first embodiment with reference to FIG. 10, thus achieving the same advantageous effects as in the first embodiment.

In addition, in the present embodiment, the total number of the magnets 22 and 42 employed in the dual-rotor electric rotating machine 10 is reduced, thereby lowering the manufacturing cost of the machine 10.

While the above particular embodiments have been shown and described, it will be understood by those skilled in the art that various modifications, changes and improvements may be made without departing from the spirit of the present invention.

For example, in the previous embodiments, the present invention is directed to the dual-rotor electric rotating machine 10 that is configured as a motor-generator. However, the present invention can also be applied to other dual-rotor electric rotating machines, such as a dual-rotor electric motor or a dual-rotor electric generator.

In the previous embodiments, each of the electric conductor segments 80 forming the stator windings 72 has the rectangular cross-sectional shape. However, each of the electric conductor segments 80 may have other cross-sectional shapes, such as a circular or elliptical cross-sectional shape.

In the previous embodiments, both the pump 12 and the reservoir 15 are arranged outside the housing 11. However, either or both of the pump 12 and the reservoir 15 may be arranged inside the housing 11.

In the previous embodiments, the dual-rotor electric rotating machine 10 is configured to include the single pump 12. However, the dual-rotor electric rotating machine 10 may be configured to include two or more pumps 12.

In the previous embodiments, the fluid 14, which is drawn up by the pump 12 from the reservoir 15, is introduced between the stator core 74 and the stator core support 71 from the vertically upper side. However, the fluid 14 may be introduced from other directions or parts provided that it is possible to reliably cool the stator windings 72 and the stator core 74 with the fluid 14.

In the previous embodiments, both the first and second rotors 20 and 40 are fixed to the disc portions 30. However, the first and second rotors 20 and 40 may be respectively fixed to two different disc portions that are fixed to the rotating shaft 50. Further, in this case, the first and second rotors 20 and 40 may be configured to rotate either in sync or async with each other.

In the previous embodiments, the stator core 74 is formed separately from the stator core support 71 and fixed by the fixing means to the stator core support 71. However, the stator core 74 may be initially formed integrally with the stator core support 71.

What is claimed is:

1. A dual-rotor electric rotating machine comprising:
 a stator including an annular stator core, at least one stator winding and a stator core support, the stator core having a plurality of slots formed therein, the at least one stator winding being mounted on the stator core so as to be received in the slots of the stator core, the stator core support being provided on one axial side of the stator core to support the stator core; and
 first and second rotors that are rotatably arranged with the stator interposed therebetween,
 wherein
 the at least one stator winding is formed of a plurality of electric conductor segments each of which is substantially U-shaped to have a base and a pair of end portions,
 the electric conductor segments are received in the slots of the stator core so that the end portions of the electric conductor segments are located on the same axial side of the stator core as the stator core support and the bases of the electric conductor segments are located on the opposite axial side of the stator core to the stator core support,
 each corresponding pair of the end portions of the electric conductor segments are electrically connected with each other,
 the stator core is fixed to the stator core support by a fixing member,
 the stator core has a through-hole, through which the fixing member extends and a plurality of fluid passages that are formed separately from the through-hole so as to allow fluid to flow through the fluid passages.
 between the stator core and the stator core support, there is formed a space into which the fluid is introduced, and
 the stator core support has an abutting part, which abuts an axial end face of the stator core so as to cover a periphery of the through-hole on the axial end face, and a guiding part that guides the fluid into the fluid passages.

2. The dual-rotor electric rotating machine as set forth in claim 1, wherein the stator is configured so that the fluid flows to collide with the at least one stator winding and then flows through the fluid passages via the guiding part of the stator core support.

3. The dual-rotor electric rotating machine as set forth in claim 2, wherein the fluid is oil or air.

4. The dual-rotor electric rotating machine as set forth in claim 1, wherein the stator core has a back core portion that is configured to form a magnetic flux merging path in which magnetic fluxes from the first and second rotors merge with each other.

5. The dual-rotor electric rotating machine as set forth in claim 1, further comprising a disc portion to which both the first and second rotors are fixed, wherein the disc portion has a higher heat conductivity than the first and second rotors.

6. The dual-rotor electric rotating machine as set forth in claim 1, wherein the first rotor includes a plurality of first magnets that are provided on a periphery of the first rotor facing the stator core,
 the second rotor includes a plurality of second magnets that are provided on a periphery of the second rotor facing the stator core, and
 each of the first magnets is offset from a corresponding one of the second magnets in a circumferential direction of the stator core by a predetermined angle.

7. The dual-rotor electric rotating machine as set forth in claim 1, wherein the first rotor includes a plurality of first magnets that are provided on a periphery of the first rotor facing the stator core,
 the second rotor includes a plurality of second magnets that are provided on a periphery of the second rotor facing the stator core, and
 the first magnets are arranged alternately with the second magnets in a circumferential direction of the stator core.

8. The dual-rotor electric rotating machine as set forth in claim 1, wherein the through-hole is formed in the stator core so as to be offset from the electric conductor segments and the fluid passages in a circumferential direction of the stator core.

9. The dual-rotor electric rotating machine as set forth in claim 1, further comprising:
   a housing that receives the stator and the first and second rotors therein; and
   a fluid supplier that supplies the fluid from an outside to an inside of the housing,
   wherein
   the space formed between the stator core and the stator core support, into which the fluid is introduced, is an interior space formed in the inside of the housing.

\* \* \* \* \*